United States Patent
Gambino et al.

(10) Patent No.: US 7,819,489 B2
(45) Date of Patent: Oct. 26, 2010

(54) CONCURRENTLY PRINTING AN IMAGE ON A FOOD PRODUCT AND A CORRESPONDING IMAGE ON PACKAGING FOR THE FOOD PRODUCT

(75) Inventors: Charles Gambino, Kalamazoo, MI (US); Dan Ostrowski, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 107 days.

(21) Appl. No.: 12/052,164

(22) Filed: Mar. 20, 2008

(65) Prior Publication Data

US 2008/0231680 A1 Sep. 25, 2008

Related U.S. Application Data

(60) Provisional application No. 60/895,754, filed on Mar. 20, 2007.

(51) Int. Cl.
B41J 3/00 (2006.01)
(52) U.S. Cl. .......................................... 347/4; 347/106
(58) Field of Classification Search ....................... 347/4
See application file for complete search history.

(56) References Cited

U.S. PATENT DOCUMENTS

| | | | |
|---|---|---|---|
| 3,446,900 A | | 5/1969 | Kamen |
| 3,867,882 A | | 2/1975 | Ahlgren et al. |
| 3,911,818 A | | 10/1975 | MacIlvaine |
| 4,962,849 A | * | 10/1990 | Anderson ................. 206/45.24 |
| 5,084,283 A | | 1/1992 | Oxley et al. |
| 5,413,830 A | | 5/1995 | Edwards |
| 5,675,369 A | * | 10/1997 | Gaskill ........................ 347/171 |
| 6,030,133 A | * | 2/2000 | Endo ............................ 400/82 |
| 6,058,843 A | | 5/2000 | Young |
| 6,102,536 A | * | 8/2000 | Jennel .......................... 347/100 |

(Continued)

OTHER PUBLICATIONS

Printing World, Spitting Distance, Jul. 24, 2000, p. 15.

*Primary Examiner*—Matthew Luu
*Assistant Examiner*—Brian J Goldberg
(74) *Attorney, Agent, or Firm*—Dickinson Wright PLLC

(57) ABSTRACT

A method for printing images on food and packaging for the food. The method includes the step of moving a plurality of food products along a first production line to a first printing station. The method also includes the step of moving a plurality of containers along a second production line to a second printing station. This step is performed during the step of moving the plurality of food products. The method also includes the step of printing a first image on at least one of the food products during the step of moving the plurality of food products. The method also includes the step of selecting a second image from a plurality of differing images in response to the first image. The second image is complementary to the first image. The method also includes the step of printing the second image on one of the containers during the step of moving the plurality of the containers. This step is preformed concurrently with the step of printing the first image. As a result of the concurrent printing of the first and second images, a printed food product and a printed container, respectively, are produced. The second image on the printed container complements the first image printed on the food product.

7 Claims, 1 Drawing Sheet

U.S. PATENT DOCUMENTS

| | | |
|---|---|---|
| 6,230,073 B1 * | 5/2001 | Kofman et al. .............. 700/204 |
| 6,616,958 B1 | 9/2003 | Stewart |
| 2001/0024670 A1 | 9/2001 | Gehan et al. |
| 2002/0015177 A1 * | 2/2002 | Yamakado et al. ......... 358/1.15 |
| 2005/0003056 A1 * | 1/2005 | Romanach et al. .......... 426/383 |
| 2005/0069612 A1 | 3/2005 | Wen et al. |
| 2005/0254090 A1 * | 11/2005 | Kammerlocher et al. ... 358/1.18 |
| 2006/0114497 A1 * | 6/2006 | Anderson et al. .......... 358/1.15 |
| 2006/0275532 A1 | 12/2006 | Dechert |
| 2008/0048012 A1 * | 2/2008 | Liou ....................... 229/87.08 |

* cited by examiner

CONCURRENTLY PRINTING AN IMAGE ON A FOOD PRODUCT AND A CORRESPONDING IMAGE ON PACKAGING FOR THE FOOD PRODUCT

CROSS-REFERENCE TO RELATED APPLICATIONS

This application claims the benefit of U.S. Provisional Patent Application Ser. No. 60/895,754 for CONCURRENTLY PRINTING AN IMAGE ON A FOOD PRODUCT AND A CORRESPONDING IMAGE ON PACKAGING FOR THE FOOD PRODUCT, filed on Mar. 20, 2007, which is hereby incorporated by reference in its entirety.

BACKGROUND OF THE INVENTION

1. Field of the Invention

The present invention relates to a food product and packaging for the food product.

2. Description of the Prior Art

A single type of food product can be produced in multiple varieties, differentiated by flavoring for example. Different varieties of the same food product are usually packaged in different packaging so the consumer can easily identify a preferred variety. Another way to differentiate different varieties of food products from one another is to color the different varieties differently.

SUMMARY OF THE INVENTION

In summary, the invention is a method for printing images on food and packaging for the food. The method includes the step of moving a plurality of food products along a first production line to a first printing station. The method also includes the step of moving a plurality of containers along a second production line to a second printing station. This step is performed during the step of moving the plurality of food products. The method also includes the step of printing a first image on at least one of the food products during the step of moving the plurality of food products. The method also includes the step of selecting a second image from a plurality of differing images in response to the first image. The second image is complementary to the first image. The method also includes the step of printing the second image on one of the containers during the step of moving the plurality of the containers. This step is performed concurrently with the step of printing the first image. As a result of the concurrent printing of the first and second images, a printed food product and a printed container, respectively, are produced. The second image on the printed container complements the first image printed on the food product.

BRIEF DESCRIPTION OF THE DRAWING

Advantages of the present invention will be readily appreciated, as the same becomes better understood by reference to the following detailed description when considered in connection with the accompanying drawings wherein.

DETAILED DESCRIPTION OF THE EXEMPLARY EMBODIMENT

Figure 1:
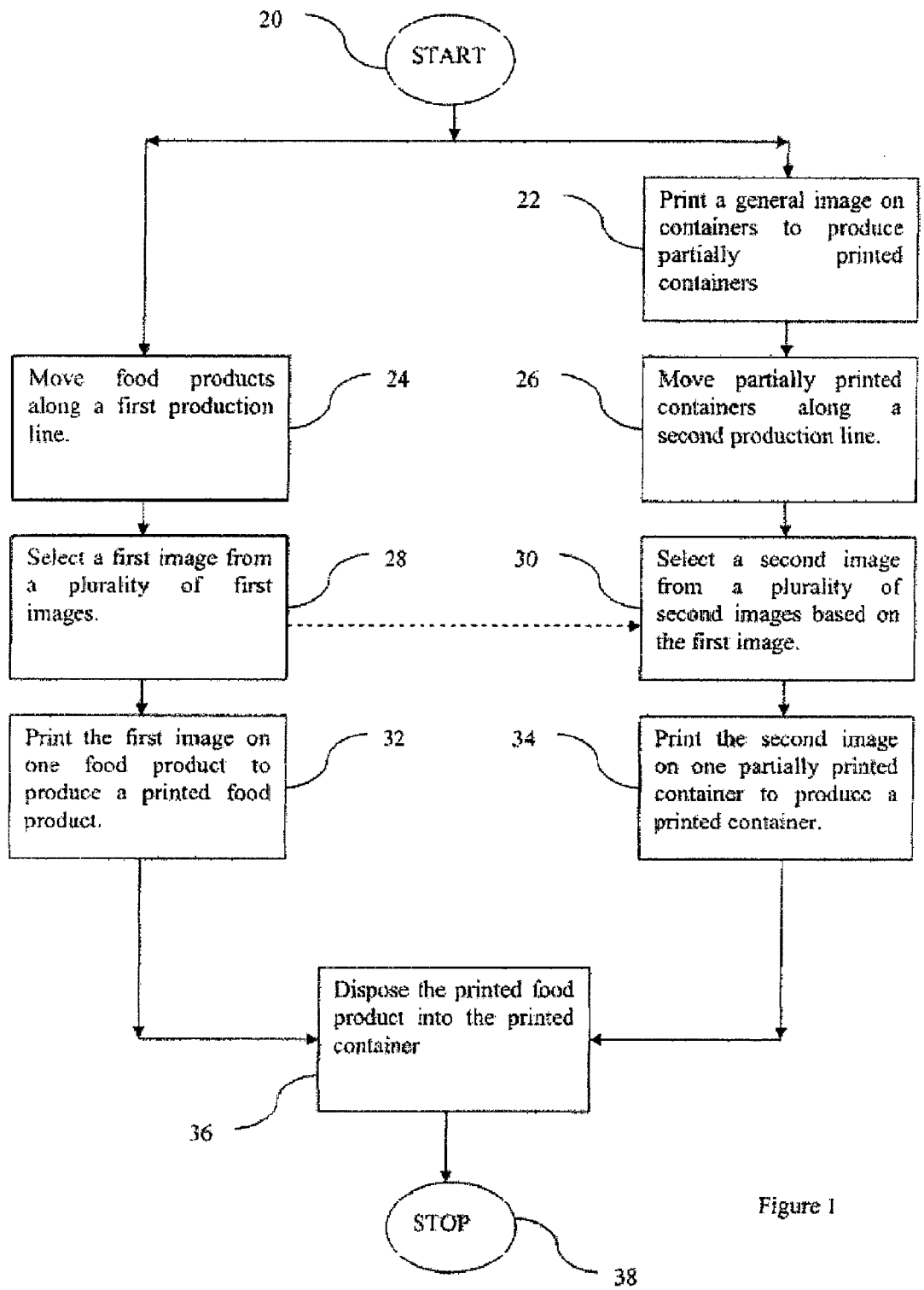
FIG. 1 is a simplified flow diagram illustrating the steps of an exemplary embodiment of the invention.

The method according to the exemplary embodiment of the invention provides for concurrent printing on food products and packaging for the food product. The food products can be any type of food product that is produced in more than one variety. The different varieties of the food product can be differentiated from one another by flavoring, color, shaper and/or any combination of these qualities. The container can be plastic or paperboard, rigid or flexible.

The exemplary method is shown schematically in FIG. 1. The method starts at step 20 and includes step 22 of printing a general image on each of a plurality of the containers to produce partially printed containers. The container could be a paperboard blank for forming a box. A general image can be a list of ingredients, nutritional information, or any other image that would be printed on the container of every variation of the food product. The general image can include everything printed on the container packaging except the specific product name, product image, and the universal product code (UPC). This general image would not need to change to accommodate the various varieties of the food product. Printing the general image at step 22 is part of the exemplary embodiment of the invention. In alternative embodiments, the invention call be practiced without step 22, wherein containers that are pre-printed with the general image are used to practice the invention.

The partially printed containers can be like-sized and designed so as to contain a predetermined quantity of the food product. The varieties of the food product may having essentially the same size and structure. As a result, each of the plurality of containers can be used to contain any one of the varieties.

At step 24, a plurality of food products are moved alone a first production line to a first printing station. The first production line can include multiple discrete stations to produce a food product. The invention contemplates the use of any food product capable of receiving and image by ink jet printing. In an exemplary embodiment, the food product can be a toaster pastry. The steps 22 and 24 are carried out in parallel paths or routines of the exemplary method.

At step 26, the plurality of the partially printed containers are moved along a second production line to a second printing station. Step 26 can be performed while the plurality of food products are moved along the first production line in step 24. In other words, the plurality of partially printed containers can be moved concurrently with the plurality of Food products. The containers and the food products need not be moved along production lines that are physically next to one another. The invention is not limited to a particular spatial relationship between the production line for the food product and the production line for the containers.

At step 28, a first image can be selected from a first plurality of differing images. The first image can be selected to correspond to the food product. For example, if the food product is a strawberry-flavored toaster pastry, the first image can be a strawberry or any other image believed to imply or suggest a strawberry. Alternatively, the first image may be a cartoon character not necessarily related to the flavor of the food product.

The movement of the food products and containers along the first and second production lines can be controlled with a common controller. The common controller can receive input data to indicate the nature of the food product. The input data can be programmed to the controller by an operator of the production line or sensors can be disposed along the production line to sense the variety of the food product and communicate sensed conditions with the controller. In response to the input data, the controller can select the first image.

The controller can be robust such that, as the variety of the food product changes during a production run, different images will be printed on the different varieties of the food product. Changing the first image can be accomplished on the fly as food products and container move along the production lines. In one example, as a plurality of cherry-flavored pastry products can be moved along the first production line first. The first image can be selected as a cherry. Then, the production changes to a blueberry-flavored pastry product and the first image is changed to a blueberry.

At step 30, a second image is selected from a second plurality of images and is selected in response to the selection of the first image. The common controller can also select the second image. Step 30 is performed in response to step 28. The selected second image will correspond to the first image. Thus, a particular variety of food product call trigger both the selection of the first image and the second image. As the food product is changed, a new first image and a new second image can be selected. In alternative embodiments of the invention, more than one second image may correspond to a first image and vice-versa. For example, there may a single second image that is printed on a container of strawberry-flavored toaster pastries, but the strawberry-flavored toaster pastries inside the container may bear several different first images. One pastry may bear a strawberry, another may bear a red, graphic image such stripes, and another may bear a cartoon character image.

Also, one or more images may be printed on the container that are not the second image. In other words, an ink jet printer on the second production line may print on the container more than just the second image that corresponds to the first image. For example, the second printer can print a production code on the container. The production code can include information such as the time, day, year, and production line of production. This information does not necessarily correspond to the first image.

In an exemplary embodiment, the food product is a strawberry-flavored pastry product. The first image can be a strawberry and the second image can be the name of the variety of the food product, at least a portion of the product image, and the UPC for strawberry-flavored pastry products.

At step 32, the first image is printed on the food product at a first printing station. As the food product moves through the first printing station, the selected first image is printed on the food product. Similarly, at step 34, the second image is printed on the partially printed container at a second printing station. Step 34 call be accomplished by printing directly on a container or by printing a label to be applied on a container. As the partially printed container moves through the second printing station, the selected second image is printed on the partially printed container. In an exemplary embodiment, the printing at both the first and second printing stations is accomplished with ink jet printers.

Step 32 and step 34 may be performed concurrently. In other words, as the first image is being printed on a particular food products moving along the first production line, the second image can be printed on containers moving along the second production line. The printed container is now specific to the particular variety of the food product that it contains due to the selection of the second image in response to the first image. However, if multiple food products are contained in a single container, each food product may not printed concurrently with the container in which it is received. Also, there may be production lag time such that any particular food item may be printed before or after the container in which it is received. For example, the food product may be printed and then frozen for ten or more minutes prior to being placed in the container. In another example, the food product may be stacked and bagged before being placed in the container, resulting in an additional ten or more minutes of processing time. The invention does not require that any individual food item is printed at the same time that the individual container it will be received in is printed. At some point in the production run, food items and containers are being printed at the same time. For example, the last few food items could be printed as the first few containers are being printed.

At step 36, printed food product is disposed in the printed container. As a result, the printed container with the second image contains the food product with the first image. In addition, the first and second images correspond to and complement one another. The method ends at step 38.

In another alternative embodiment of the invention, the method can be practiced such that single variation of a food product printed with a plurality of different images and contained in a plurality of differently printed containers. An example of this alternative embodiment is set forth below. The process described in the paragraphs below is only an example and not limiting as to the invention.

Waffles may be the food item and may move along the first production line in a single variation. The variation is "single" in that the waffles moving along the first production line are made from the same ingredients. The sum of waffles moved along the first production line may receive a plurality of different images. An image in the form of a cartoon character can be printed on a first quantity of waffles moved along the first production line. The containers moved along the second production line to receive to the first quantity of waffles can receive a second image that corresponds to the cartoon character. The first quantity of waffles can be desirable to market and/or advertise a television show or a movie.

After the first quantity of waffles has moved along the first production line, a second quantity of waffles can be moved along the first production line. An image in the form of logo can be printed on the second quantity of waffles. The containers roved along the second production time to receive to the second quantity of waffles can receive a second image that corresponds to the logo. The second quantity of waffles can be desirable to market and/or advertise a business and/or corporation.

After the second quantity of waffles has moved along the first production line, a third quantity of waffles can be moved along the first production line. An image in the form of a Christmas tree can be printed on the third quantity of waffles. The containers moved along the second production line to receive to the third quantity of waffles can receive a second Image that corresponds to the Christmas tree. The third quantity of waffles can be desirable to celebrate and/or commemorate the Christmas holiday.

The first, second and third quantities of waffles are directed to three different marketing goals, but can be produced substantially immediately in order without slowing or stopping the production lines. The controller of the ink jet printers can be programmed by an operator to recognize when an image-change should occur. Alternatively, the controller can communicate with sensors such as proximity sensors to count the waffles moving along the first production line and change the images printed on the waffle and the container when a predetermined number of waffles have been printed with a particular image. The exemplary embodiment of the invention described above would substantially eliminate the costs associated with developing specialize packaging as well as the costs associated with container waste. A single generic, pre-printed container can be utilized for all waffles that are similar based on ingredients but dissimilar based on the image received.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for printing images on food and packaging for said food comprising the steps of:

moving a plurality of food products along a first production line to a first printing station;

moving a plurality of containers along a second production line to a second printing station during said step of moving the plurality of food products;

controlling the first and second printing stations with a common controller capable of receiving input data for indicating the nature of the plurality of food products;

receiving input data by the common controller to indicate the nature of the plurality of food products;

selecting by the common controller a first image in response to the input data;

printing the first image on at least one of the food products during said step of moving the plurality of food products to produce a printed food product;

selecting by the common controller a second image from a plurality of images in response to the first image such that the second image is complementary to the first image;

printing the second image on at least one of the containers during said step of moving the plurality of the containers to produce a printed container having the second image printed thereon such that the printed container corresponds to the printed food product; and disposing the printed food product into the corresponding printed container;

wherein said step of printing the first image is performed concurrently with said step of printing the second image.

2. The method as set forth in claim 1 including the step of:

printing a general image on each of the plurality of containers prior to said step of moving the plurality of containers.

3. The method as set forth in claim 1 wherein said step of printing the first image is further defined as printing the first image with an ink jet printer.

4. The method as set forth in claim 1 wherein said step of printing the second image is further defined as printing the second image with an ink jet printer.

5. The method as set forth in claim 1 wherein said selecting by the common controller step is further defined as selecting by the common controller a first image from a plurality of images in response to the input data.

6. The method as set forth in claim 1 further including the step of:

programming the input data into the common controller.

7. The method as set forth in claim 1 further including the steps of:

sensing at least one of the food products with at least one sensor disposed along the first production line to determine the input data; and communicating the input data sensed from the at least one food product to the common controller.

* * * * *

UNITED STATES PATENT AND TRADEMARK OFFICE
CERTIFICATE OF CORRECTION

| | | |
|---|---|---|
| PATENT NO. | : 7,819,489 B2 | Page 1 of 1 |
| APPLICATION NO. | : 12/052164 | |
| DATED | : October 26, 2010 | |
| INVENTOR(S) | : Charles Gambino et al. | |

It is certified that error appears in the above-identified patent and that said Letters Patent is hereby corrected as shown below:

(57) Abstract, Line 15 "preformed" should read -- performed --

Column 2, Line 4 "shaper" should read -- shape --

Column 2, Line 21 "call" should read -- can --

Column 2, Line 30 "alone" should read -- along --

Column 3, Line 14 "call" should read -- can --

Column 3, Line 44 "call" should read -- can --

Column 4, Line 35 "roved" should read -- moved --

Column 4, Line 35 "time" should read -- line --

Signed and Sealed this
Fourth Day of January, 2011

David J. Kappos
*Director of the United States Patent and Trademark Office*